United States Patent [19]

Zaremba, Jr. et al.

[11] 3,727,638

[45] Apr. 17, 1973

[54] DRAIN PLUG ASSEMBLY

[75] Inventors: John P. Zaremba, Jr., Pittsfield; Peter D. Cooney, Lenox; Craig W. Hadden, Pittsfield, all of Mass.; David E. Shupp, Downers Grove, Ill.

[73] Assignee: Progressive Products, Inc., Pittsfield, Mass.

[22] Filed: Apr. 26, 1971

[21] Appl. No.: 137,218

[52] U.S. Cl. .................137/572, 188/352, 251/346, 251/351, 184/1.5
[51] Int. Cl. ................................................F16n 1/00
[58] Field of Search .................188/352; 184/1.5; 251/341, 346, 349, 351, 294, 144; 141/98, 351

[56] References Cited

UNITED STATES PATENTS

| | | | |
|---|---|---|---|
| 982,009 | 1/1911 | Morgan | 251/351 X |
| 1,423,418 | 7/1922 | Grikscheit | 251/346 |
| 1,816,004 | 7/1931 | Collier | 184/1.5 |
| 3,196,688 | 7/1965 | Smith | 251/351 X |
| 3,301,282 | 1/1967 | Fresolone | 141/98 |
| 3,406,700 | 10/1968 | Beazer et al. | 251/294 X |
| 3,602,273 | 8/1971 | Flentge et al. | 141/313 |
| 2,985,180 | 5/1961 | Grayson | 251/351 X |

*Primary Examiner*—Henry T. Klinksiek
*Attorney*—Stepno & Neilan

[57] ABSTRACT

A liquid reservoir drain plug assembly is provided which is particularly suitable for automobile oil pans. The assembly is composed of a pair of plug members, one adapted to receive the other. The first member is tubular with a tapered top portion and adapted to be received by a drainage outlet in the reservoir. The second member is also tubular and adapted to be tightly received by said first member in the tapered portion thereof. The second member has a top and bottom portion, the top portion terminating in a cone and having openings in its sides. Upon loosening the second member, liquid is allowed to flow from the reservoir through the tapered portion of the first member and through the second member via the openings in the top portion. Conveniently, the second member is adapted to receive drain means, such as a hose, and a cover member to prevent foreign matter from entering when it is tightly secured in the first member.

5 Claims, 6 Drawing Figures

INVENTORS
JOHN P. ZAREMBA JR.
PETER D. COONEY
CRAIG W. HADDEN
DAVID E. SHUPP

Stepno and Neilan
ATTORNEYS

DRAIN PLUG ASSEMBLY

BACKGROUND OF THE INVENTION

At the present time, oil pans in automobile engine assemblies are all equipped with a drain plug to remove the contents when it is desired to change the oil for new, clean oil. This task of changing the oil in an automobile requires removal of the plug, drainage of the contents out of the pan and reinsertion of the plug prior to refilling with new oil. Such an operation is usually quite messy and inconvenient since the oil usually starts to flow out of the opening prior to complete removal of the plug, and the oil must be directed into a collection means considerably below the reservoir. It generally requires that the automobile be placed on a lift in order that the person changing the oil can work under the automobile. As a result, most oil changes are done at gas stations, etc., since an individual automobile owner does not have the lift facilities and it is too inconvenient and messy for him to change the oil in his car at his home.

There have been previous attempts at alleviating this situation, that is, drain plug assemblies have been designed for the purpose of allowing drainage in a more simple manner. However, these prior art devices have not proven satisfactory due to the fact that these assemblies are complex in their design, and usually having relatively exotic valve construction which is generally spring-biased. Since they are complex, their cost has been a major factor in their non-acceptance.

It is accordingly an object of the present invention to provide a drain plug assembly for a liquid reservoir which is simple in its design and operation.

It is a further object of this invention to provide a drain plug assembly which is readily adaptable to existing automobile oil pans.

It is still a further object of this invention to provide a drain plug assembly which is operable by an unskilled person and which will drain an automobile oil pan in one simple, clean operation.

These and other objects will be apparent from the description given hereinafter.

SUMMARY OF THE INVENTION

In accordance with this invention, there is provided a liquid reservoir drain plug assembly comprising a first tubular member having an inwardly tapering top portion and adapted to be received by an opening in said reservoir, a second tubular member adapted to be received by said first member and having a top portion and a bottom portion, said top portion having at least one opening in the side thereof and terminating in a cone, said top portion being adapted to fit tightly into the tapering portion of said first member whereby flow of liquid is prevented through said tapering portion into said second tubular member through the openings therein, and means to loosen said second member to allow flow of liquid from the reservoir through said tapering portion into said openings in said second member and out through said bottom portion.

The invention also contemplates the addition of a cap into which is receivable the bottom portion and which prevents foreign matter from entering into said second member when both members are secured together into the reservoir. Further, means are provided to drain and collect liquid from the reservoir through the assembly of this invention.

DESCRIPTION OF THE PREFERRED EMBODIMENTS

The invention will be more fully understood with reference to the accompanying drawings, wherein like numerals indicate like elements.

Figure 1:
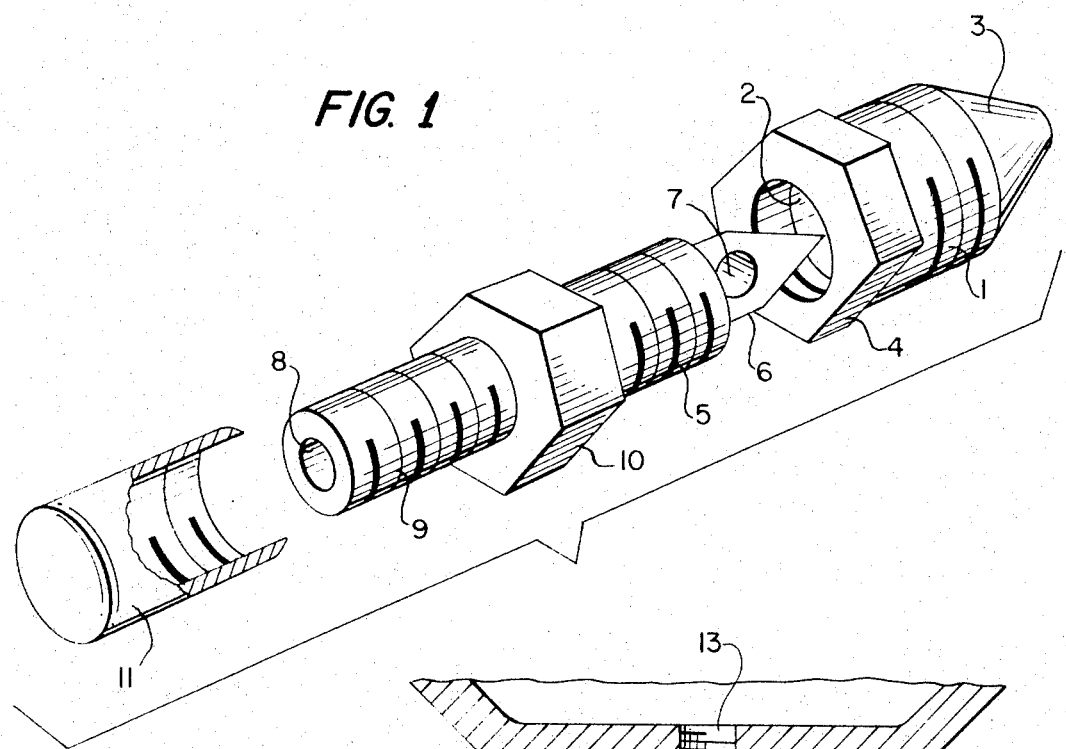
FIG. 1 is an exploded perspective view, partially in cross-section, of the drain plug assembly of this invention, illustrating additionally a cover member adapted to be secured thereto to prevent foreign matter from entering into the tubular members.

In the drawings, specifically referring to FIG. 1, a first tubular member or female plug 1 is adapted to be securedly inserted into an outlet opening in a liquid reservoir, such as the oil pan of an automobile, preferably rotatably, i.e., by screw threads. The said first member 1 has a duct 2 therethrough, a top, inwardly tapering portion 3, and base member 4. As mentioned, the said first tubular member 1 tapers inwardly at its distal end 3, and is provided with a preferably integral hexagonal nut 4 at its proximal end to aid in tightly screwing the plug into the threaded oil drain outlet opening in an, e.g., automobile oil pan. Duct 2 extends the entire length of the plug 1 and defines an inner passage therethrough. This inner passage or conduit 2 also is preferably threaded so as to tightly rotatably receive the second tubular member or male plug 5 which likewise is preferably exteriorly threaded.

The plug 5 is provided with a solid distal end 6 terminating in a conical configuration. Duct 8 extends from an opening in the proximal end 9 of the said plug 5 to a point somewhere in the conical end of the plug whereat communication with the exterior of the plug 5 is provided by means of at least one opening 7. Intermediate the length of the said plug 5 is another hexagonal nut 10, advantageously integral therewith, to aid in tightly screwing the plug 5 into the plug 1. It will be appreciated that the nut 10, especially when integral with the said plug 5, must be of such distance from the distal end 6 as to enable sufficient length of the plug 5 to be inserted into the plug 1 that a liquid-tight force fit is provided between the said solid distal end of the plug 5 and the periphery of the opening in the distal end of the said plug 1. Likewise, the at least one opening 7 into the duct 8 must be of such distance from the apex of the conical distal end 6 that, upon tightly screwing the plug 5 into the plug 1, no portion of said at least one opening 7 extends beyond said liquid-tight force fit existing circumferentially between the walls of the plug 1 defining the duct 2 at the distalmost end thereof, and a circumference of the conical, solid distal end 6 of the said plug 5 (see FIGS. 2 and 3).

Dust cap 11 is designed to preferably screw onto the proximal end 9 of the plug 5 to insure against oil dripping and contamination from atmospheric borne particles.

Figure 2:
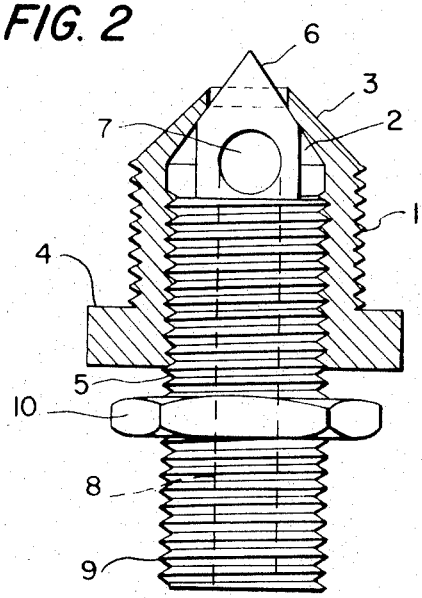
FIG. 2 is an enlarged fragmentary vertical sectional view of a drain plug assembly of this invention in the closed, sealed position.
Figure 2A:
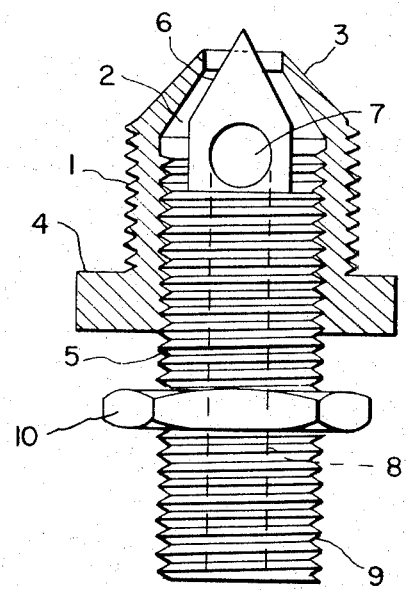
FIG. 2a is an enlarged fragmentary vertical sectional view showing the plug assembly of FIG. 2 in the open or draining position.

FIGS. 2 and 2a illustrate the drain plug assembly of this invention in the closed and open position, respectively. In FIG. 2, plug 5 is tightly inserted into member 1 so as to provide a liquid-tight force fit between distal end 6 and the circumferential wall of duct 2. If desired, end 6 may be coated with a resilient or lubricant coating material, such as Teflon, rubber, vinyl plastic, and the like, to insure a snug liquid-tight seal around the entire circumference of that portion of end 6 in contact with the inner walls of duct 2. The plug assembly illustrated in FIG. 2 depicts the location of opening 7 at a point below the conical tip of end 6. It will be noted that that portion of end 6 in which opening 7 is located has a smaller circumference than the remainder of plug 5 so that, upon loosening of plug 5 and the downward movement thereof within member 1, liquid, e.g., oil, will be allowed to flow freely through duct 2 and into opening 7. This is more clearly shown in FIG. 3a wherein, upon loosening of plug 5, via nut 10, the seal is removed and the liquid is allowed to flow from the reservoir through duct 2 into opening 7 and out through duct 8.

Figure 3:
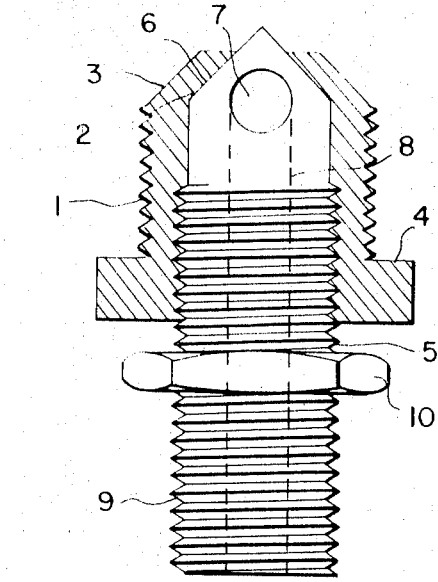
FIG. 3 is an enlarged fragmentary vertical sectional view of another structure of the drain plug assembly of this invention in the closed, sealed position.
Figure 3A:
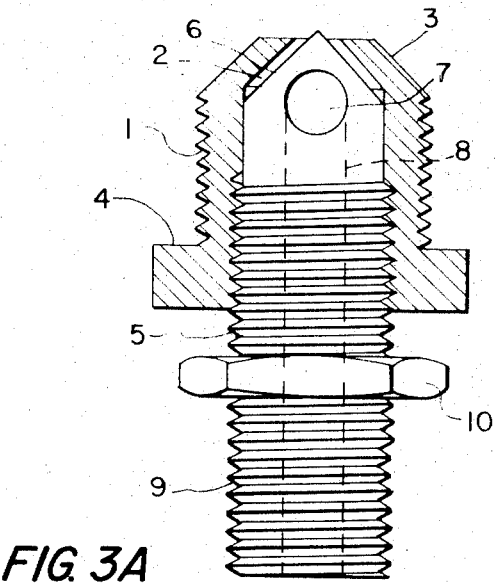
FIG. 3a is an enlarged fragmentary vertical sectional view showing the plug assembly of FIG. 3 in the open, or draining position.

FIGS. 3 and 3a illustrate a drain plug similar to that shown in FIG. 2 with the exception that opening 7 is located in the conical portion of end 6. In such an assembly the opening must be below that portion of end 6 which forms the circumferential liquid-tight force fit with the interior walls of duct 2. Since the nature of the conical tip requires that it taper to the apex, when the opening 7 is located therein it will not, upon loosening of plug 5, be obstructed by the walls defining the duct 2. This is shown in FIG. 3a wherein, after loosening plug 5, via nut 10, liquid is allowed to flow freely through duct 2 into opening 7 and out through duct 8.

Figure 4:
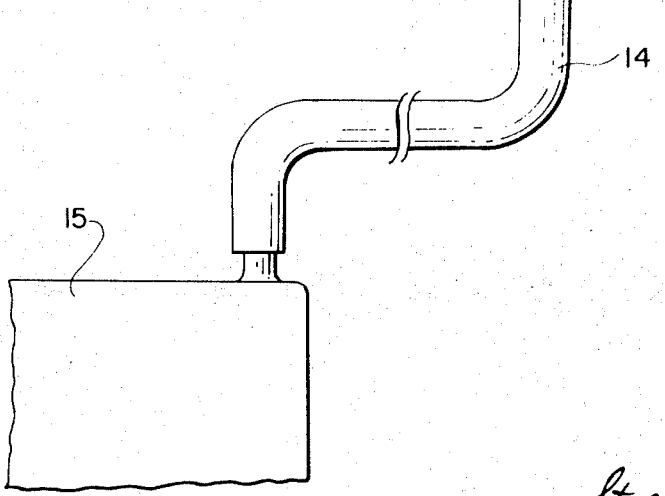
FIG. 4 is an exploded perspective view of the drain plug assembly of this invention shown in conjunction with a liquid reservoir and drainage and collection means, and illustrating the manner in which the drain plug assembly is inserted and removed from the reservoir.

Referring next to the FIG. 4, to install the liquid reservoir drain plug assembly of FIG. 1 in an, e.g., automobile oil pan, the existing oil drain plug in the automotive oil pan is removed. A washer 16 (e.g., nylon) is next slipped over the existing, threaded drain plug orifice and the said female plug 1 is tightly screwed into the automotive oil pan in the stead of the stock item. At this point a fluid tight seal exits between the said plug 1 and the existing orifice in the oil pan. The male plug 5 is then tightly screwed into the plug 1 as in FIG. 2, and at this point a fluid tight seal exists between all of the plugs 1 and 5 and the existing orifice or outlet in the oil pan. The dust cap 11 is ultimately attached.

To use the aforesaid liquid reservoir drain plug assembly of FIGS. 1 and 2 when desired to change or remove the oil from the automotive oil pan, the dust cap 11 is removed and the plug 5 is loosened a few turns (e.g., about 3 turns), advantageously by means of the hexagonal nut 10, to a position exemplified by FIGS. 2a and 3a, whereupon the oil in the oil pan begins to drain through the duct 2 in the distal end of the said plug 1, thence through the at least one opening 7 in the plug 5 and into the duct 8 and out and into an awaiting receptacle. Upon termination of the drainage procedure the assembly is merely retightened by means of nut 10 as per the above.

In a most preferred embodiment, as also illustrated in FIG. 4, an oil refuse hose 14 or conduit is provided which may be telescoped over the proximal end of the said plug 5. This hose aids in directing the draining oil from oil pan 12, through opening 13 to any suitable receptacle 15. Most advantageously the hose is provided at its outlet end with a disposable bag, e.g., a 5 quart thermoplastic bag, for immediate collection of the draining oil, which bag, when the drainage procedure is completed, can conveniently be sealed and merely discarded with absolutely no risk of accident to the operator.

It can thus readily be seen that the assembly of the present invention provides a simple economic means to drain an automobile oil pan or other type liquid reservoir with a minimum of effort on behalf of the operator and with little, if any, possibility of dripping oil onto the ground or the operator's hands or clothing. The assembly, moreover, is adapted to take advantage of existing, stock outlet means, and is conveniently fabricated from such materials as free cutting brass.

The foregoing is to be considered as illustrative of the principles of this invention only. It is to be understood that the scope of the invention is to be determined by the scope of the appended claims.

What is claimed is:

1. In combination with an automobile oil pan, a drain plug assembly comprising:
    an annular housing adapted to be received in a threaded outlet port of the oil pan and having a first end portion inwardly tapered to define a frusto-conical valve seat, an intermediate portion defining a first set of screw threads on an exterior surface thereof for cooperation with said outlet and a second set of screw threads on an interior surface thereof concentric with said first set of screw threads, said threads overlapping at least in part, and a second end portion defining means adapted to cooperate with a tool for enabling insertion and removal of said annular member by rotation thereof in said outlet; and
    an externally threaded hollow tubular member adapted to be received in said annular housing and having a top portion terminating in a cone with at least one opening in the side thereof communicating with the hollow interior of said member, said top portion conforming with said frusto-conical valve seat to fit tightly into said housing for providing a seal therewith, an intermediate portion defining means for enabling the opening and closing of said assembly by rotation of said tubular member, and a bottom portion defining an outlet.

2. The assembly as recited in claim 1, further comprising means to cap the bottom portion of said tubular member to prevent matter from entering therein.

3. The assembly as recited in claim 1, wherein the cone on said top portion of said tubular member is coated with a resilient material.

4. The assembly as recited in claim 1, further comprising oil conduit means connected at one end to the outlet of said tubular member and at its other end to liquid collection means.

5. The assembly as recited in claim 4, wherein said liquid collection means comprises a disposable, thermoplastic receptacle for receiving the entire contents of the oil pan.

* * * * *